United States Patent
Chen et al.

(10) Patent No.: US 10,728,510 B2
(45) Date of Patent: Jul. 28, 2020

(54) DYNAMIC CHROMA KEY FOR VIDEO BACKGROUND REPLACEMENT

(71) Applicant: MOTOROLA MOBILITY LLC, Chicago, IL (US)

(72) Inventors: Yinhu Chen, Deerfield, IL (US); Daniel Bloom, Loveland, CO (US); Susan Yanqing Xu, Westmont, IL (US); Weihua Sun, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 63 days.

(21) Appl. No.: 15/945,021

(22) Filed: Apr. 4, 2018

(65) Prior Publication Data
US 2019/0313071 A1   Oct. 10, 2019

(51) Int. Cl.
| | |
|---|---|
| *H04N 9/75* | (2006.01) |
| *H04N 13/271* | (2018.01) |
| *G06T 7/11* | (2017.01) |
| *G06T 7/194* | (2017.01) |
| *G06T 5/40* | (2006.01) |
| *G06T 5/00* | (2006.01) |

(Continued)

(52) U.S. Cl.
CPC .............. *H04N 9/75* (2013.01); *G06T 5/009* (2013.01); *G06T 5/40* (2013.01); *G06T 7/11* (2017.01); *G06T 7/194* (2017.01); *G06T 11/001* (2013.01); *H04N 13/271* (2018.05); *G06T 2207/10016* (2013.01); *G06T 2207/10028* (2013.01); *H04N 13/257* (2018.05); *H04N 2013/0081* (2013.01)

(58) Field of Classification Search
CPC ...... H04N 9/75; H04N 13/271; H04N 13/257; H04N 2013/0081; G06T 5/40; G06T 5/009; G06T 11/001; G06T 7/194; G06T 7/11; G06T 2207/10016; G06T 2207/10028; G06T 11/00
See application file for complete search history.

(56) References Cited

U.S. PATENT DOCUMENTS

| | | | | |
|---|---|---|---|---|
| 5,781,198 A | * | 7/1998 | Korn | ...................... H04N 5/272 345/634 |
| 6,912,313 B2 | * | 6/2005 | Li | ........................... G06T 11/00 348/586 |

(Continued)

OTHER PUBLICATIONS

Bozdag, D. Graph Coloring and Clustering Algorithms for Science and Engineering Applications. (Electronic Thesis or Dissertation). Retrieved from https://etd.ohiolink.edu/ (Year: 2008).*

*Primary Examiner* — Obafemi O Sosanya
(74) *Attorney, Agent, or Firm* — Yudell Isidore PLLC (57) ABSTRACT

A method, a device, and a computer program product for background image replacement in image data. The method includes receiving, from at least one image sensor of a device, frame data. The device generates a first depth map based on the received frame data. The device generates first foreground image data and first background image data, based on the first frame data and the first depth map. The method further includes determining a least used color in the first foreground image data. The least used color is identified as a first background color. The method also includes generating modified frame data by replacing the first background image data with the first background color and storing the modified frame data to a memory of the device.

19 Claims, 8 Drawing Sheets

(51) Int. Cl.
*G06T 11/00* (2006.01)
*H04N 13/257* (2018.01)
*H04N 13/00* (2018.01)

(56) References Cited

U.S. PATENT DOCUMENTS

| | | | |
|---|---|---|---|
| 8,139,142 B2* | 3/2012 | Bamji | G01S 17/89 |
| | | | 348/348 |
| 9,076,076 B1* | 7/2015 | Ioffe | G06F 16/51 |
| 9,552,655 B2* | 1/2017 | Freeman | G06T 11/001 |
| 9,661,239 B2* | 5/2017 | Guissin | G06T 5/008 |
| 10,055,107 B2* | 8/2018 | Price | G06T 7/13 |
| 10,175,867 B2* | 1/2019 | Price | G06F 3/04845 |
| 10,356,341 B2* | 7/2019 | Holzer | H04N 13/282 |
| 2015/0169992 A1* | 6/2015 | Ioffe | G06K 9/46 |
| | | | 382/218 |
| 2015/0248775 A1* | 9/2015 | Freeman | G06T 7/174 |
| | | | 345/589 |
| 2016/0171706 A1* | 6/2016 | Somanath | G06T 7/11 |
| | | | 382/154 |
| 2016/0284096 A1* | 9/2016 | Buford | G06T 7/11 |
| 2017/0124717 A1* | 5/2017 | Baruch | G06T 7/187 |
| 2017/0193644 A1* | 7/2017 | Fry | G06T 5/40 |
| 2017/0244908 A1* | 8/2017 | Flack | G06K 9/00234 |

* cited by examiner

DYNAMIC CHROMA KEY FOR VIDEO BACKGROUND REPLACEMENT

BACKGROUND

1. Technical Field

The present disclosure generally relates to electronic devices having image sensors and in particular to background replacement of image data captured by an image sensor of an electronic device.

2. Description of the Related Art

Many modern personal devices, such as cellular phones, are equipped with image sensors (as part of one or more cameras, for example) that can be used to capture images and/or video. Image processing techniques can be used to modify the captured image. One such image processing technique is chroma key processing. Chroma key processing is a visual effects, post-production technique for compositing or layering two images or video streams together based on the color hues or chroma range contained in the images). Chroma key processing is used to remove a background from the subject of a photo or video. Unfortunately, if the color of the foreground subject being captured in the photo or video is similar to the background color, the foreground subject can disappear from the image or video stream.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a device, and a computer program product for background image replacement in image data. The method includes receiving, from at least one image sensor of a device, first frame data for a first frame. The device generates a first depth map based on the first frame data. The device generates first foreground image data and first background image data, based on the first frame data and the first depth map. The method further includes generating, by the device, a first color histogram of the first foreground image data and determining a first least used or not used color in the first color histogram. The first least used or not used color is identified as a first background color. The method also includes replacing the first background image data with the first background color, generating modified first frame data by combining the first background image data with the first foreground image data and storing the modified first frame data and the first background color to a memory of the device.

According to another embodiment, a device comprises an image sensor and one or more processors communicatively coupled to a memory. The processors execute program code that enables the device to replace background image data. The execution of the program code further enables the device to receive, from the image sensor, first frame data for a first frame and generate a first depth map based on the first frame data. The execution of the program code further enables the device to generate first foreground image data and first background image data, based on the first frame data and the first depth map. The execution of the program code further enables the device to generate a first color histogram of the first foreground image data. The execution of the program code further enables the device to determine a first least used or not used color in the first color histogram and identify the first least used or not used color as a first background color. The execution of the program code further enables the device to replace the first background image data with the first background color, generate modified first frame data by combining the first background image data with the first foreground image data and store the modified first frame data and the first background color to a memory of the device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1A:
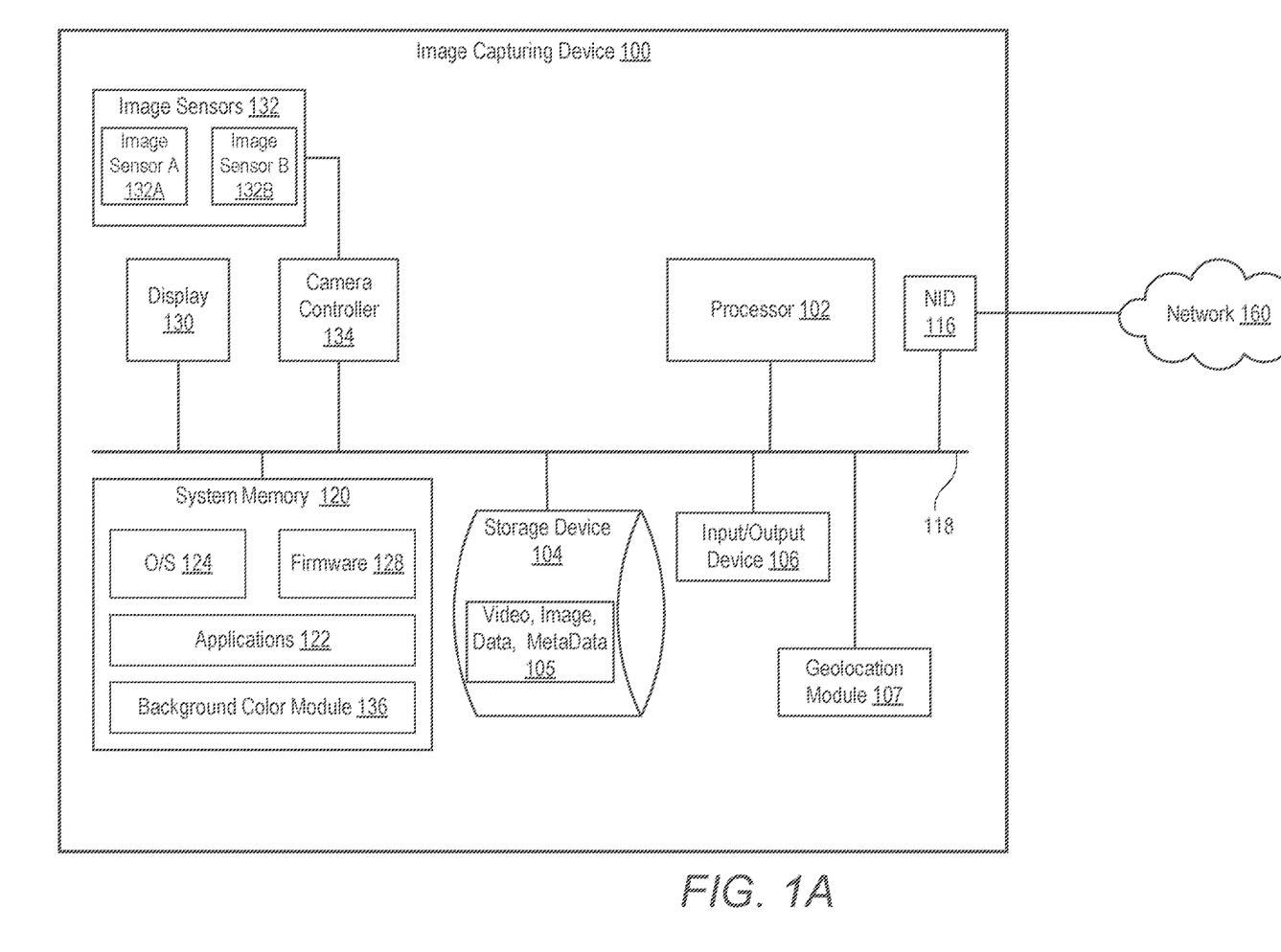
FIG. 1A depicts an example image capturing device within which various aspects of the disclosure can be implemented, according to one or more embodiments.

FIG. 1A depicts an example image capturing device 100 within which various aspects of the disclosure can be implemented, according to one or more embodiments. Image capturing device 100 can be any electronic device that can capture an image. Examples of such electronic devices include, but are not limited to, a desktop computer, a monitor, a notebook computer, a mobile phone, a digital camera, a video recorder, a tablet computer, etc. Image capturing device 100 includes a processor 102, and a storage device 104 providing a local database 105 with video and image files, data and/or metadata. Additionally, image capturing device 100 includes an input/output device 106, a geo-location module 107, a network interface device 116, a system bus 118, system memory 120, a display 130, one or more image sensors 132, and a camera controller 134. System bus 118 communicatively couples one or more of the image capturing device components to one or more other image capturing device components, such as processor 102 and system memory 120. In some instances, components, such as image sensors 132 and camera controller 134, may be communicatively coupled via a mechanism other than the system bus 118 (e.g., a direct connection). In one embodiment, image sensors 132 can include image sensor 132A and 132B. Image sensors 132A and 132B can form a stereo camera for capturing images that are perceived as being three-dimensional and range imaging. Image sensors 132A and 132B can generate stereo image data. Although FIG. 1A depicts particular components as being communicatively coupled via system bus 118 or directly to each other, the particular components used to couple components of an image capturing device can vary between implementations. For example, system bus 118 can be implemented using an optical fiber bus or a wireless system bus.

System memory 120 may be a combination of volatile and non-volatile memory, such as random access memory (RAM) and read-only memory (ROM). System memory 120 can store program code or similar data associated with firmware 128, an operating system 124, applications 122, and background color module 136. Although depicted as being separate from the applications 122, background color module 136 may also be implemented as an application. The processor 102 loads and executes program code stored in system memory 120. Examples of program code that may be loaded and executed by processor 102 include program code associated with applications 122 and background color module 136.

One or more networks, generally represented as network 160, can be in communication with image capturing device 100. Network 160 can be a variety of networks such as a local area network, a wide area network, a wireless network or the internet. To enable this communication, image capture device 100 includes network interface device 116, which is a communication module that facilitates communications between image capturing device 100 and network 160.

According to one aspect of the disclosure, in operation, image sensors 132 are activated by a user, application, or other mechanism. In response to determining that one or more criteria are met, image sensors 132 capture image or video data and sends the image data to processor 102 via camera controller 134. In one embodiment, camera controller 134 can be a dedicated hardware device that is optimized for processing image and video data. The image or video data may then be sent to display 130 and/or stored (e.g., to system memory 120 and/or storage device 104). In one embodiment, a user can elect to modify the captured image or video data using features provided by execution of background color module 136. For example, the user can elect to modify the captured image or video data (using features provided by background color module 136) via an input provided using input/output device 106. When elected by a user, processor 102 loads and executes background color module 136, which enables processor 102 to analyze the image data, identify a least used foreground color as a new background color and replace the current background color of the image with the new background color.

According to one embodiment, in response to capturing the image data, the processor 102 loads the background color module 136 from the system memory 120 and executes the program code associated with the background color module 136. The processor 102 analyzes the image data, identifies a least used foreground color as a new background color and replaces the current background color with the new background color. In one embodiment, once the background color module 136 is activated for a received image/video data, processor 102 dynamically processes the image data for each video frame of the received image/video data. The modified image or video data with the new background color may then be sent to the display 130 and/or stored (e.g., to system memory 120 and/or storage device 104).

Figure 1B:
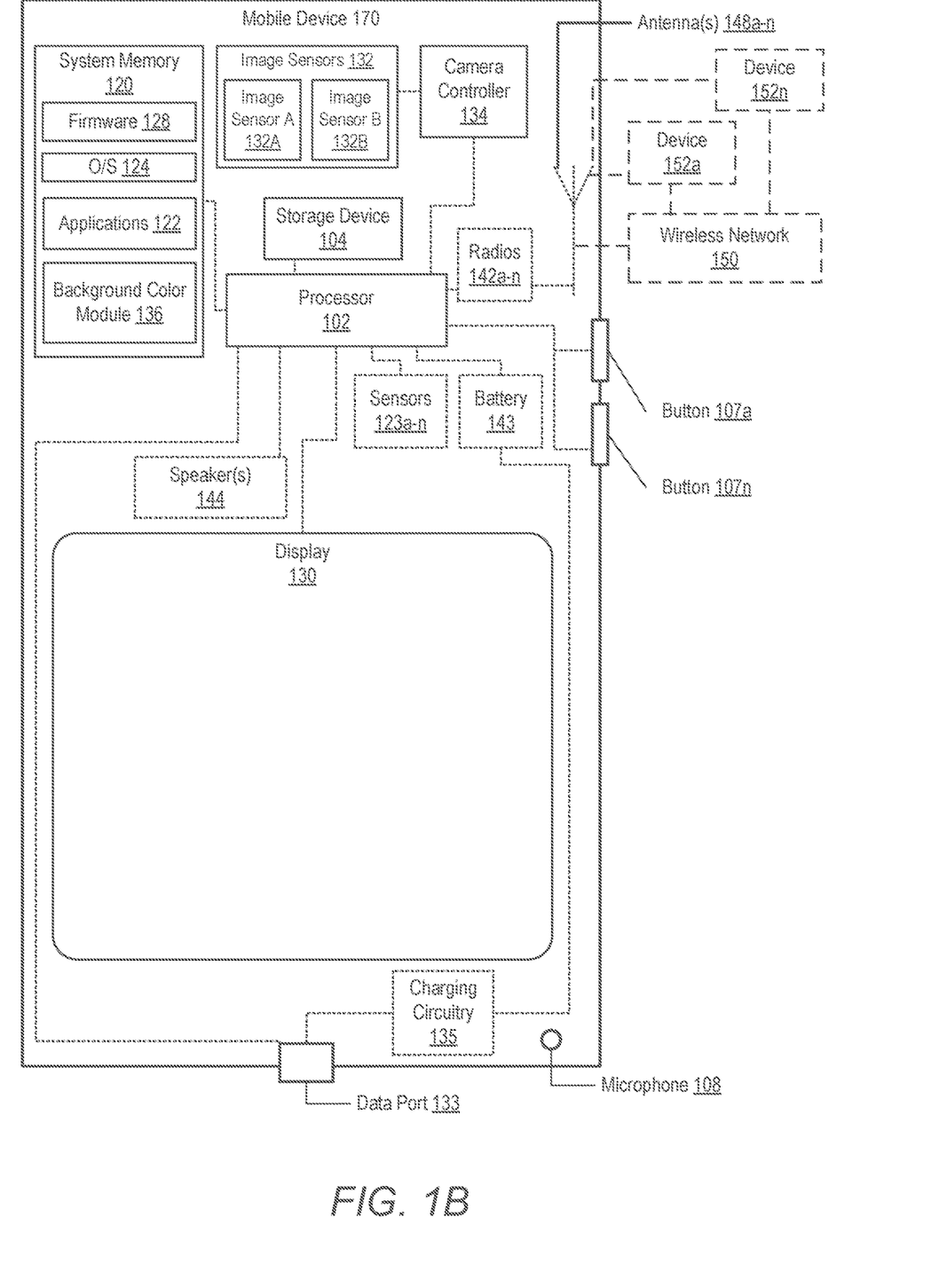
FIG. 1B depicts an example mobile device configured to be an image capturing device, according to one or more embodiments.

FIG. 1B depicts an example mobile device configured to be an image capturing device, according to one or more embodiments. Mobile device 170 includes processor 102, storage device 104, system memory 120, display 130, image sensors 132, and camera controller 134. In one embodiment, image sensors 132 can include image sensor 132A and 132B. Image sensors 132A and 132B can form a stereo camera for capturing perceived three-dimensional images and range imaging. Image sensors 132A and 132B can generate stereo image data. In addition to comprising some of the same or similar components as the example image capturing device 100, mobile device 170 can further include data port 133 coupled with the processor 102, charging circuitry 135, and battery 143. In one embodiment, display 130 can be a touch screen device that can receive user input. Mobile device 170 further includes a microphone 108, one or more speakers 144, one or more buttons 107*a-n*, and sensors 123*a-n*. Buttons 107*a-n* may include volume buttons, a power button, a camera shutter button, etc. Mobile device 170 further includes radios 142*a-n*, which are coupled to antennas 148*a-n*. In this example, the radios 142*a-n* and the antennas 148*a-n* allow mobile device 170 to communicate wirelessly with devices 152*a-n* via wireless network 150.

Within the description of the present disclosure, mobile device 170 operates similarly to image capturing device 100 in processing images and videos using the features provided by execution of background color module 136. In particular, a user can elect to operate mobile device 170 to capture image data and image metadata via the image sensor 132 and camera controller 134. Camera controller 134 can process image data and image metadata from image sensor 132 and provide the data in formats that are more readily handled by other components of image capture device 100. The user can elect to further process or modify the captured image data by activating (via input buttons 107*a-n* or touch input provided on display 130) the features provided by background color module 136. When the specific functions or features of the disclosure are elected by a user, processor 102 loads and executes the background color module 136, which enables processor to analyze the image data, identify a least used foreground color as a new background color, and replace the current background color with the new background color.

Figure 2:
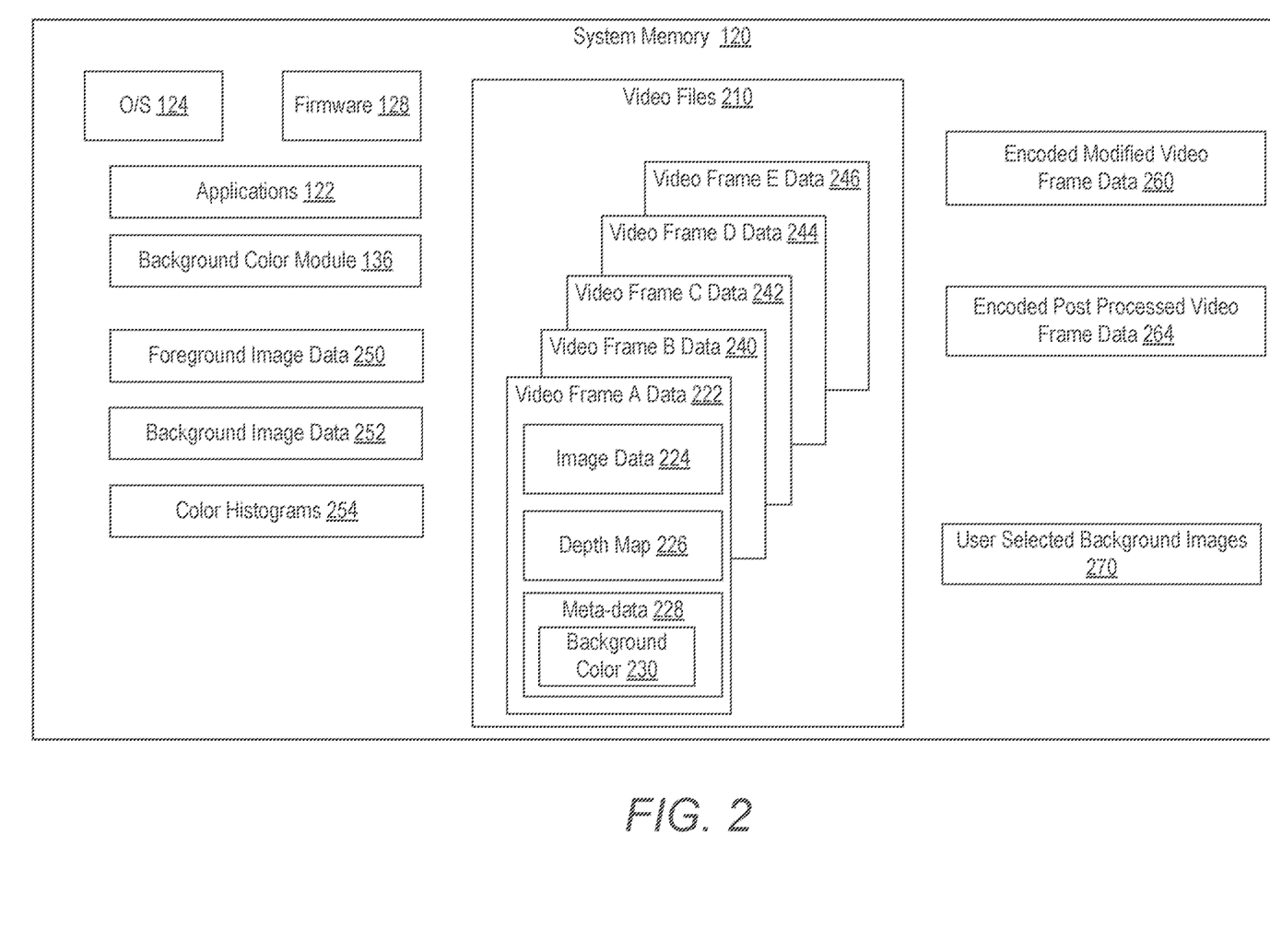
FIG. 2 is a block diagram illustrating example contents of the system memory of an image capturing device, according to one or more embodiments.

In the description of each of the following figures, reference is also made to specific components illustrated within the preceding figures. With reference now to FIG. 2, one embodiment of example contents of system memory 120 of image capturing device 100 is shown. System memory 120 includes data, software, and/or firmware modules, including firmware 128, operating system 124, applications 122, and background color module 136. Background color module 136 enables dynamic replacement of the contents of background object pixels in video frames of video files with a least used color associated with foreground objects. Background color module 136 further enables dynamic replacement of the contents of background object pixels that are the same color as the background color with a user selected background image. In one embodiment, background color module 136 performs the processes presented in the flowcharts of FIGS. 6 and 7 as will be described below.

System memory 120 further includes one or more video files 210 that are recorded or captured by image capture device 100. Video files 210 contain video frame data for one or more individual video frames. For example, video files 210 include video frame data A 222, video frame data B 240, video frame data C 242, video frame data D 244 and video frame data E 246. Video frame data A 222 includes image data 224, a depth map 226 and meta-data 228. In one embodiment, image data 224 can be YUV data. YUV is a color encoding system typically used as part of a color image pipeline. YUV encodes a color image or video taking human perception into account, allowing for reduced bandwidth. YUV data defines a color space in terms of one brightness or luma (Y) component and two color or chrominance (UV) components. In one embodiment, image data 224 can be stereo image data 224 that includes stereo YUV data. Stereo YUV data defines the color space for each image data received from image sensors 132A and 132B. Stereo image data 224 can be stereo image data from two image sensors (i.e., image sensor 132A and 132B).

Depth map 226 contains information relating to the distance of the surfaces of scene objects from a viewpoint. Depth map 226 can be generated by processor 102 from stereo camera frame data (i.e. image data 224) produced by image sensors 132. In one embodiment, active depth methods can be used by image capturing device 100 to produce time of flight (TOF) data (via a laser device) or structured light data (via an infra-red device) or other approaches. Meta-data 228 includes data in regards to or about video frame A data 222. In one embodiment, meta-data 228 includes a background color 230 that has been dynamically determined by processor 102 to be the background color for video frame data A 222. Similarly, each of the other video frame data (i.e., video frame data 240-246) also contain image data, a depth map, and meta-data for their respective video frame.

System memory 120 further includes foreground image data 250, background image data 252, and color histograms 254. Foreground image data 250 represents data (such as YUV data, brightness, and color) describing objects that are in the foreground of video frame data, and background image data 252 represents data describing objects that are in the background of video frame data. In one embodiment, processor 102, executing background color module 136, can partition or segment image data 224 for a video frame into foreground image data 250 and background image data 252 using depth map 226. Color histograms 254 are a representation of the distribution of foreground colors in foreground image data 250 for the video frame. The color histogram 254 represents the number of pixels that have colors in each of a fixed list of color ranges.

System memory 120 also includes encoded modified video frame data 260, encoded post processed video files 264, and user selected background images 270. Encoded modified video frame data 260 contains modified video frame data for a plurality of video frames in which the background color has been replaced with a least used foreground color. The encoded modified video frame data also has been formatted and compressed (encoded) for faster processing and to take up less storage space. Encoded post processed video files 264 are encoded video frame data for a plurality of video frames in which the background color has been replaced with a user selected background image 270 during a post processing procedure (i.e. after the video has been recorded). User selected background image 270 is an image or video that has been selected by a user to replace the background objects or image data in one or more video frames.

With additional reference to FIGS. 1A and 1B, during implementation of the aforementioned image/file processing, the image sensors 132 are activated by a user, an application running on the image capturing device 100, or other mechanism to capture an image/video. The user can further activate captured image processing via background color module 136 to replace the background image data with a least used foreground color, as the video is recording (i.e., real-time processing). After activation, camera controller 134 determines that image data 224 should be captured based, at least in part, on one or more criteria. The specific criteria can vary between implementations. Example criteria may be the reception of a triggering event, such as a user tapping a shutter button (e.g., one of buttons 107a-n).

In response to determining that the image data 224 should be captured, based, at least in part, on the one or more criteria, camera controller 134 signals image sensors 132 to capture image data 202. After image data 224 is captured, the image data 224 is sent to processor 102, which is executing the program code of background color module 136. For each video frame, processor 102 determines a least used foreground color in image data 224. Processor 102 identifies the least used color as the new background color and replaces the current background image data with the new background color for each video frame. In one embodiment, each video frame can have a different background color, such that the background color is changing from video frame to the next video frame. The modified video frame with the new background color is (or can be) sent to the display 130 for viewing by the user and the modified video is (or can be) stored to system memory 120 or storage device 104.

Figure 3A:
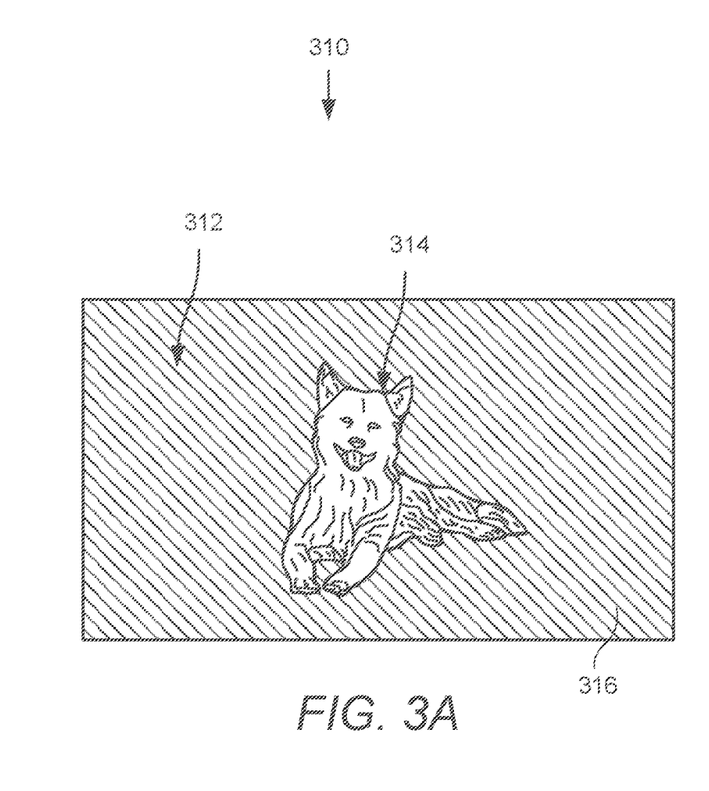
FIG. 3A is an example video frame, illustrating foreground objects and background objects, according to one or more embodiments.

FIG. 3A illustrates an example video frame 310, including foreground objects and background objects, captured by image capture device 100 during video recording. Video frame 310 includes one or more foreground objects 314 and background objects 312. In FIG. 3A, the dog is a foreground object and the background object is green in color. Video frame 310 is composed of a plurality of pixels 316. The pixel is the smallest controllable element of a picture represented on a display. Each pixel is a physical point in a raster image, or the smallest addressable element in an all points addressable display device. Each pixel has an associated content such as a brightness value (luma) and associated color values (chroma).

Figure 3B:
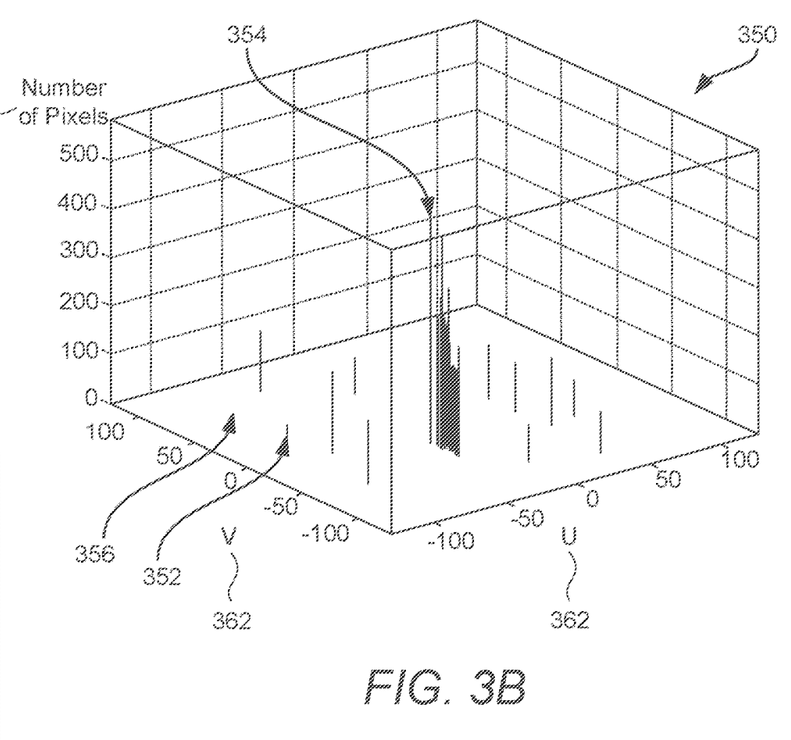
FIG. 3B is an example color histogram of the colors used in the foreground objects of FIG. 3A, according to one or more embodiments.

FIG. 3B illustrates an example color histogram 350 of the foreground colors contained in FIG. 3A. Color histogram 350 is a representation of the distribution of foreground colors in foreground objects 314. Color histogram 350 includes multiple colors. The color histogram represents the number of pixels that have colors in each of a fixed list of color ranges, that span the image's color space, the set of all possible colors. Color histogram 350 has a Y-Axis representing a normalized number of pixels 360, an X-axis representing V color values 362 and a Z-axis (depth) representing U values 364 in the YUV color encoding system. Color histogram 350 includes vertical lines representing the multiple colors found in the foreground objects 314. Color histogram 350 contains the least frequently used foreground color 352 and the most frequently used foreground color 354. In one embodiment, the least frequently used foreground color can be a color that is not used 356. In the case where there is more than one color that is not used 356, the least frequently used foreground color can be randomly selected from the colors that are not used. In an embodiment, a user can be allowed to pre-select or pre-determine one or more preferred colors. When there is more than one color that is not used, the color closet to the user selected preferred color would be identified as the least frequently used foreground color.

In one embodiment, processor 102, executing background color module 136, can generate depth map 226 from stereo image data 224 and can generate color histogram 350 from image data 224 and depth map 226 for a video frame. Processor 102 can further analyze color histogram 350 to determine a least used color in the foreground objects 314 and identify the least used foreground color as a new background color 230 to replace the current background colors of the video frame data. The color with the smallest number of pixels used in the foreground objects can be selected as the least used color.

Figure 4A:
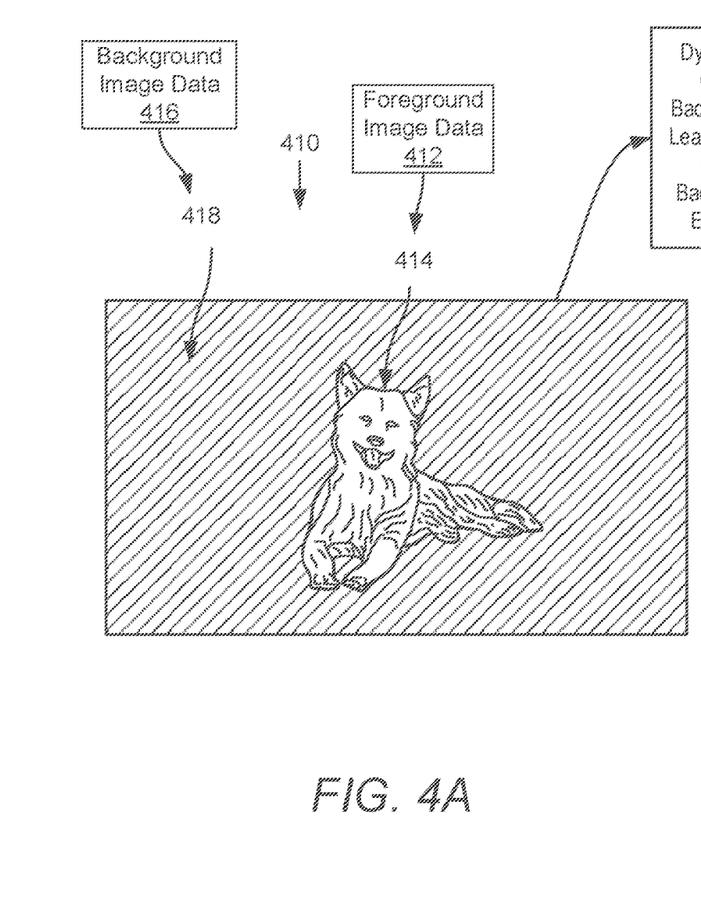
FIG. 4A is an example video frame, illustrating foreground objects and background objects, according to one or more embodiments.

FIG. 4A illustrates an example video frame 410 captured by image capture device 100 during video recording. Video frame 410 is stored as image data 224 (FIG. 2). Video frame 410 can be partitioned by processor 102 into foreground image data 412 representing foreground objects 414 and background image data 416 representing background objects 418 based on the depth map for the respective frame. In FIG. 4A, the dog is a foreground object having multiple colors and the background object is brown in color. In FIG. 4A, the background object has been cross-hatched brown using the patent office graphical drawing symbol for brown color. In one embodiment, the foreground object (i.e., dog) of FIG. 4A can be primarily black, white and brown in color.

In response to capturing the image data, the processor 102 loads the background color module 136 from the system memory 120 and executes the program code associated with the background color module 136 to replace background colors of an image. Processor 102 generates a depth map 226 based on the stereo image data. Processor 102 generates a color histogram 254 corresponding to foreground image data 412 (based on the stereo image data and depth map) and determines a least used color (i.e., green) of the foreground objects in color histogram 254. In the example of FIG. 4A, there are several colors (i.e. blue, green, red and others) that are not used in the foreground object. A least frequently used foreground color (i.e., green) can be randomly selected from the colors that are not used in color histogram 254. Processor 102 identifies the least used color as the new or replacement background color (i.e, green) 230. Processor 102 replaces the pixels or pixel data in the background image data 416 with the new or replacement background color 230. Thus, in the presented example, the brown colored background of the original video frame that is captured by the image capturing device is replaced with a green colored background within a modified video frame, for example, modified video frame 420 of FIG. 4B. The replacement background color 230 is thus the least used foreground color, as indicated by the color having the smallest number of pixels in the color histogram or being randomly selected from several colors that are not used in the color histogram.

Figure 4B:
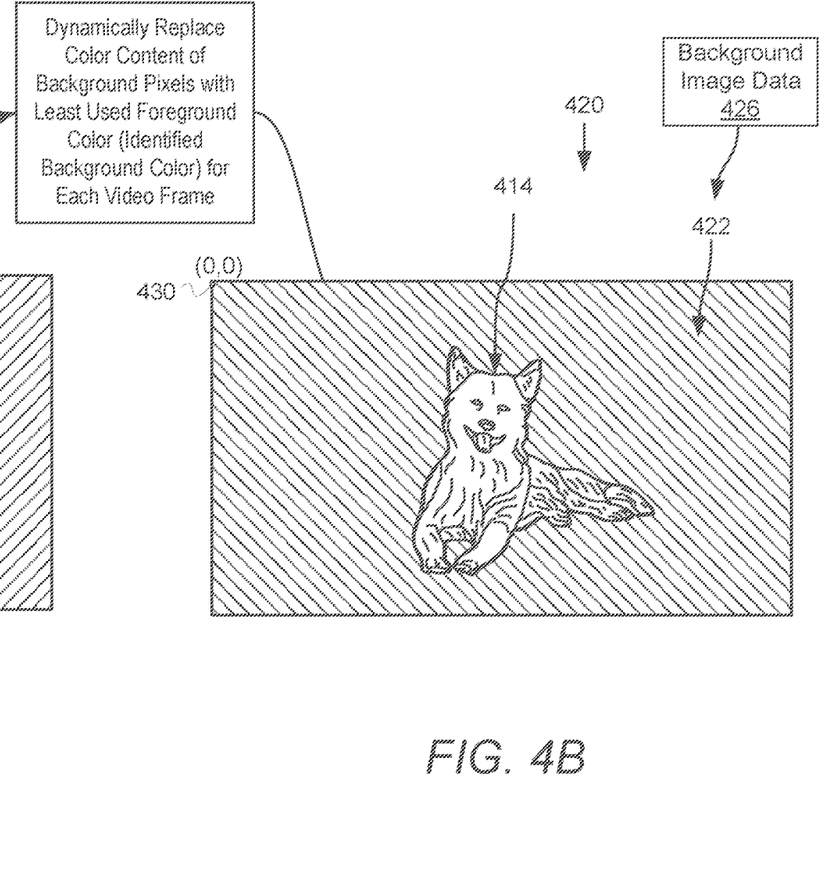
FIG. 4B is an example video frame, illustrating the replacement of the background object of FIG. 4A with a least used color of the foreground objects, according to one or more embodiments.

Turning to FIG. 4B, there is shown an example modified video frame 420. Within modified video frame 420, processor 102 has replaced the brown background pixel contents of FIG. 4A with green background pixel contents in background image data 426 representing background objects 422. In FIG. 4B, the brown background pixel contents of FIG. 4A have been replaced with the least used foreground color (e.g., green) for all of the pixel contents in the background. In FIG. 4B, the background object has been cross-hatched green using the patent office graphical drawing symbol for green color. The foreground image data 412 and foreground objects 414 are unchanged. In other words, the foreground objects 414 of FIG. 4B remain the same color as in FIG. 4A. Processor 102 can dynamically replace the background color pixel contents (i.e. background image data) in each video frame 410 as the video frames are being captured by image capture device 100. In one embodiment, processor 102 stores the background color 230 within meta-data 228. In another embodiment, processor 102 stores the background color 230 as a pixel color in a single pixel position 430. In FIG. 4B, the pixel position 430 is shown as the top left pixel (0,0). The resulting modified video frame 420 can be stored. When a stored video is being replayed with background color replacement, the stored color in the single pixel can be retrieved and then used as the same value for all of the other background pixels when displaying the video.

The use of dynamically replacing the contents of the background color pixels (i.e. background image data) with the least used foreground color in each video frame provides for a more clear and accurate background replacement in each video frame. The use of dynamically replacing the contents of the background color pixels (i.e. background image data) with the least used foreground color in each video frame also reduces the occurrence of foreground objects having the same color as the background objects. When foreground objects have the same color as the background objects, they disappear during replacement with the same background color.

Figures 5A, 5B:
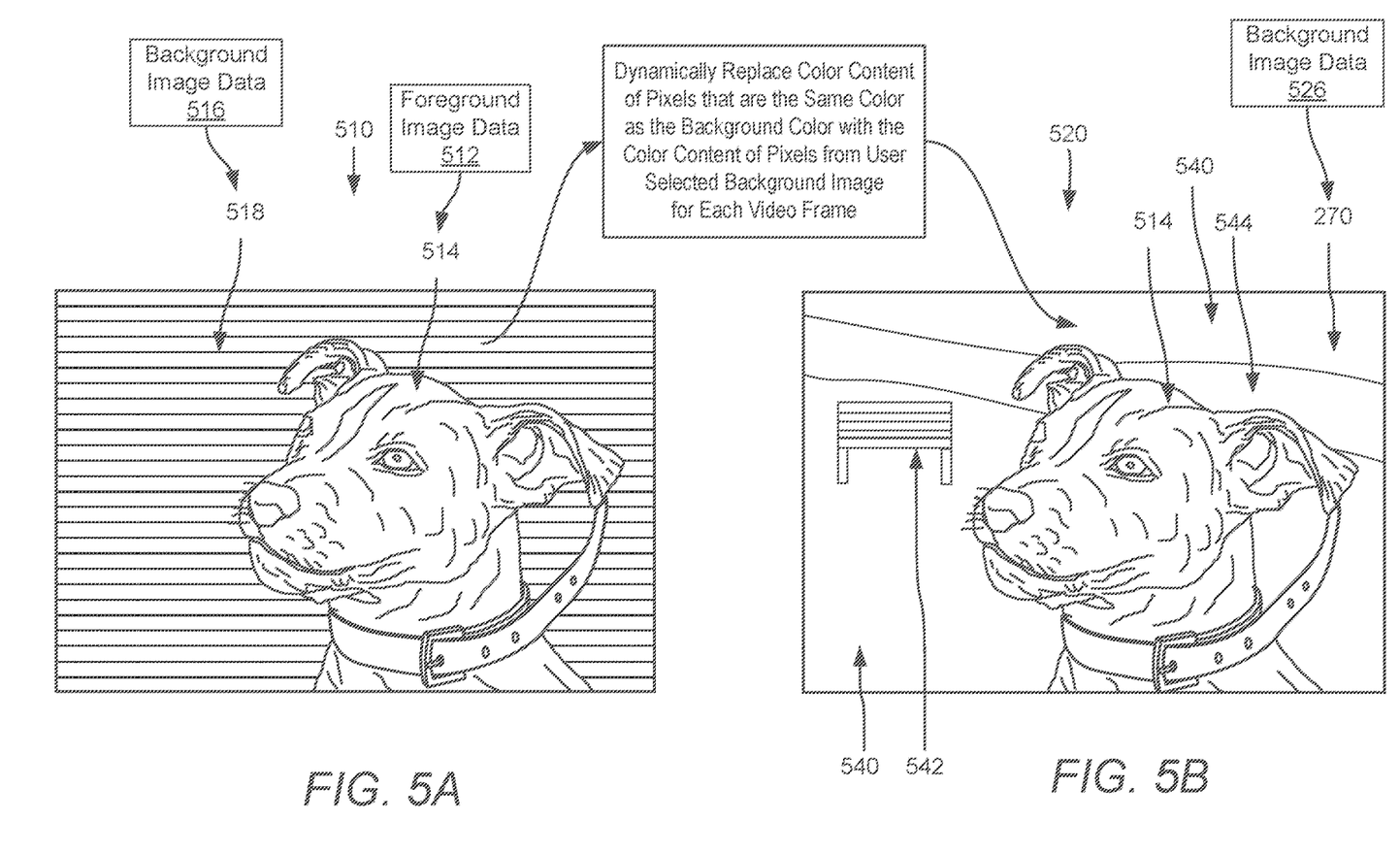
FIG. 5A is an example video frame, illustrating foreground objects and background objects, according to one or more embodiments.
FIG. 5B is an example post processed video frame, illustrating the replacement of a background image of FIG. 5A with a user selected background image, according to one or more embodiments.

FIG. 5A illustrates an example video frame 510 captured by image capture device 100 during image capture or video recording. Video frame 510 is stored as image data 224 (FIG. 2) in video frame data. Processor 102 generates a depth map 226 based on the image data. Video frame 510 can be partitioned by processor 102 into foreground image data 512 representing foreground objects 514 and background image data 516 representing background 518 based on the depth map for the respective frame. In FIG. 5A, the dog is a foreground object and the background is blue in color. In one embodiment, the foreground object (i.e., dog) of FIG. 5A can be primarily black, white and brown in color. In FIG. 5A, the background has been cross-hatched blue using the patent office graphical drawing symbol for blue color.

In one embodiment, a user can elect to replace the background 518 with a user selected background image 270 (FIG. 2) at a later time after image capture has been completed (i.e., post processing). Processor 102 loads background color module 136 from the system memory 120 and executes the program code associated with background color module 136. Processor 102 receives a user selected background image 270. Processor 102 identifies the background color 230 stored in meta-data 228 or in a pixel position, such as pixel position 430. Processor 102 dynamically replaces the pixel contents in background image data 516 that match the background color 230 with corresponding pixel contents from the user selected background image 270 or from a user selected background video. Processor 102 generates a modified video frame with the user selected background image or background video.

Turning to FIG. 5B, modified video frame 520 is shown. Within modified video frame 520, processor 102 has replaced the blue background pixels of FIG. 5A with a user selected image 270 that is stored in background image data 526. The user selected image 270 is of a park with grass 540 that is colored green, a sidewalk 544 that is colored grey and a park bench 542 that is colored red. For clarity, the background of FIG. 5B has not been cross-hatched using graphical drawing symbols. The foreground objects (i.e., dog) of FIG. 5B remain the same color as in FIG. 5A, such as primarily black, white and brown. Thus, background image data 516 of FIG. 5A has been replaced with new background image data 526, which contains user selected background image 270. The foreground image data 512 and foreground objects 514 are unchanged. Processor 102 can dynamically replace the content of background color pixels (i.e., background image data 516) in each video frame 510 with the pixel content of user selected background image 270 during post video capture processing. The resulting modified video frame 520 can be stored.

One benefit of using image capturing device 100 to dynamically replace least used foreground color pixels (i.e. background image data) with a user selected image in each video frame is to provide a clearer and more accurate background replacement in each video frame. When foreground objects have the same color as the background objects, the foreground objects disappear (or are not clearly visible) during replacement of the background image/color with the same background color as the foreground objects' color. Another benefit of dynamically replacing the least used foreground color pixels (i.e. background image data) with a user selected image in each video frame by image capturing device 100 is to reduce the occurrence of foreground objects having the same color as the background objects.

Figure 6:
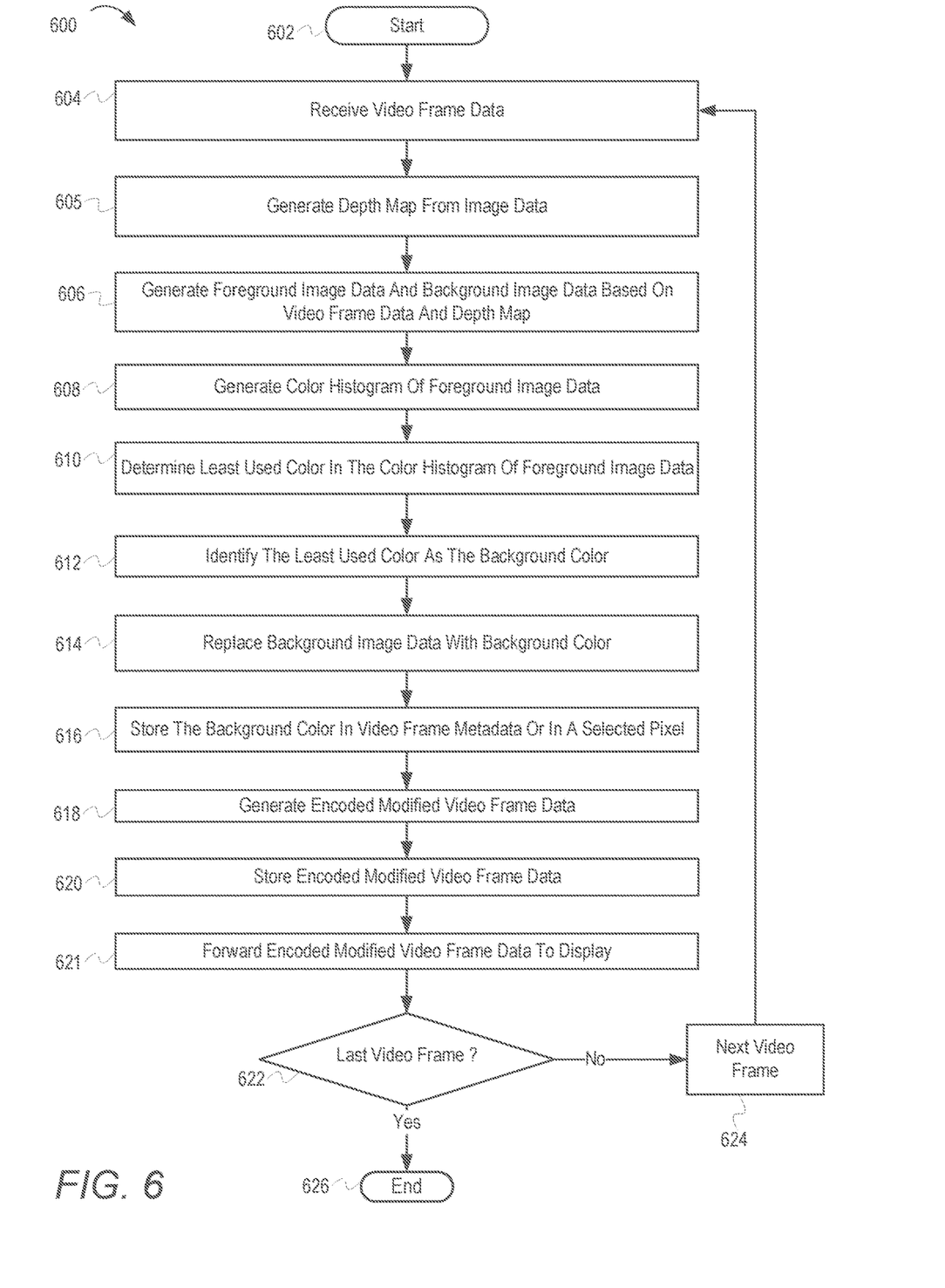
FIG. 6 depicts a method of dynamically replacing background image data in video frames of video files with a least used color associated with foreground image data, according to one or more embodiments.

FIG. 6 depicts a method 600 of dynamically replacing background image data in video frames with a least used color associated with foreground image data, according to one or more embodiments. The description of method 600 will be described with reference to the components and examples of FIGS. 1-5B. The operations depicted in FIG. 6 can be performed by image capturing device 100 or any suitable device, including one or more components of image capturing device 100. For example, one or more of the processes of the method described in FIG. 6 may be performed by a processor (e.g., processor 102) executing program code associated with the background color module 136 within an image capturing device (e.g., image capturing device 100).

Method 600 begins at the start block 602. At block 604, processor 102 receives, from camera controller 134, video frame data for an initial video frame (i.e., video frame data A 220), including image data 224. Image data 224 can be stereo image data from two image sensors (i.e., image sensor 132A and 132B). Processor 102 generates depth map 226 based on image data 224 (block 605). Processor 102 generates foreground image data 250 and background image data 252, based on the image data 224 and depth map 226 for the respective video frame (block 606). Processor 102 generates color histogram 254 of the foreground image data 250 (block 608) and determines a least used color in the color histogram (block 610). Processor 102 identifies/selects the least used color as the background color 230 (block 612). Processor 102 replaces the original background color content provided within background image data 252 with the background color 230 (block 614). In one embodiment, processor 102 replaces the color content (chroma) of pixels in the background image with the color content of the background color 230.

At block 616, processor 102 stores the background color 230 to system memory 120 as the new background image data. In one embodiment, background color 230 is stored with meta-data 228. In another embodiment, background color 230 is stored as the pixel color content in a single pixel position 430 (FIG. 4B) such as the top left pixel (0,0). Processor 102 generates encoded modified video frame data 260 for the respective video frame (i.e. video frame data A 222) based on the foreground image data and the new background image data that has been generated using the least used foreground color (block 618). During encoding, the encoded modified video frame data 260 is formatted and compressed (encoded) for faster processing and to take up less storage space.

Processor 102 stores the encoded modified video frame data 260 to system memory 120 or storage (block 620). Processor 102 forwards or transmits the encoded modified video frame data 260 to display 130 for presentation thereon (block 621). The display will show the foreground image data with the background color. At decision block 622, processor 102 determines if the current video frame data is the last video frame data in the sequence of video frames that is being recorded. In response to determining that the current video frame data is the last video frame data in the sequence of video frames that is being recorded, method 600 ends at end block 626. In response to determining that the current video frame data is not the last video frame data in the sequence of video frames that is being recorded, processor 102 selects the next video frame (block 624) and returns to block 604 to continue receiving video frame data for the next video frame (i.e., video frame B data 240) including image data 224. Processor 102 can repeat blocks 604-620 such that, as a video is recorded, the background image is dynamically or continuously being replaced with a background color that is the least used foreground color for each video frame.

Figure 7:
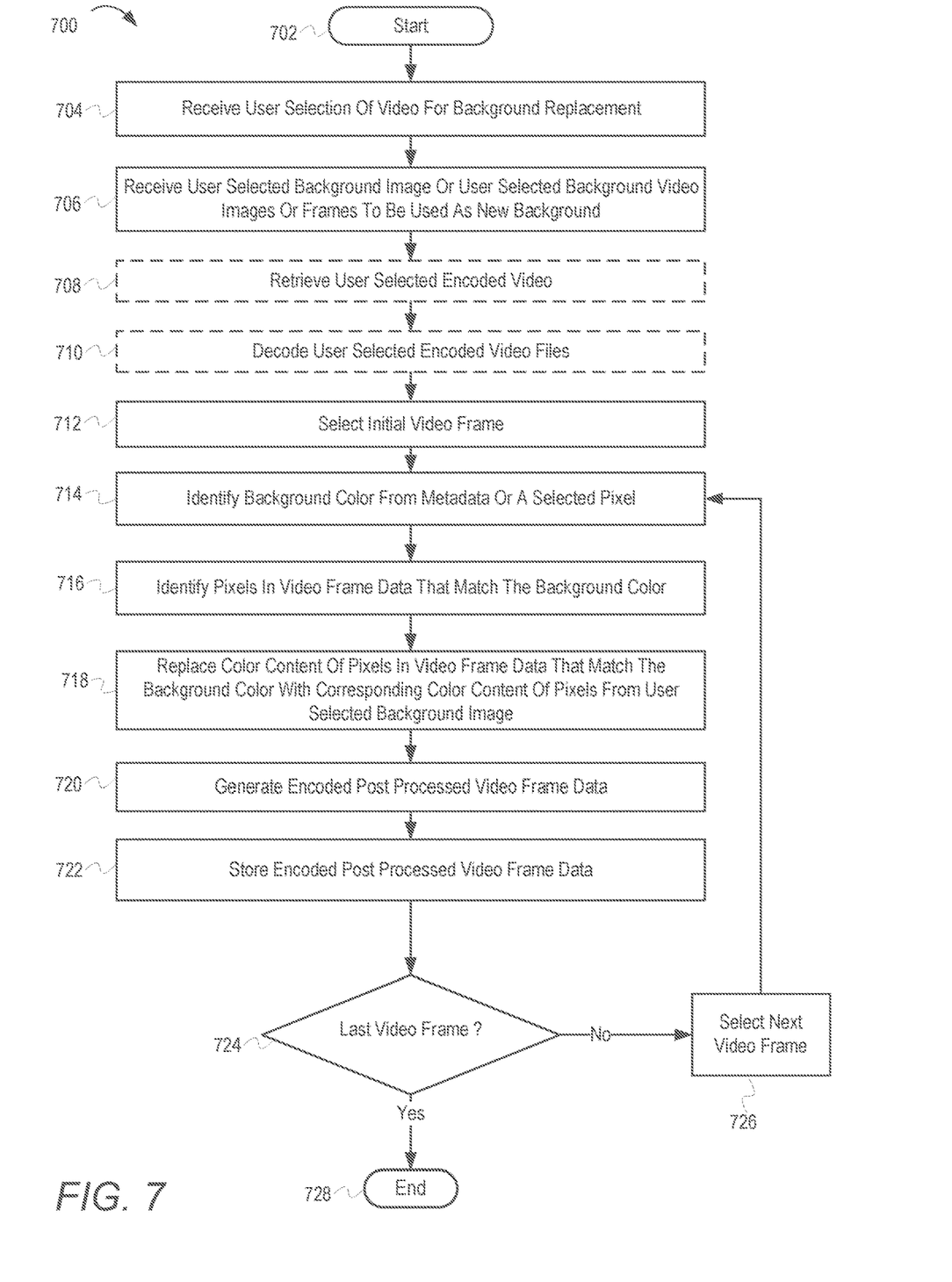
FIG. 7 depicts a method of dynamically replacing background image data with a user selected background image, according to one or more embodiments.

FIG. 7 depicts a method 700 of dynamically replacing background image data in a video file with a user selected background image, according to one or more embodiments. The description of method 700 will be described with reference to the components and examples of FIGS. 1-5B.

The operations depicted in FIG. 7 can be performed by image capturing device 100 or any suitable device, including one or more components of image capturing device 100. For example, one or more of the processes of the method described in FIG. 7 may be performed by a processor (e.g., processor 102) executing program code associated with the background color module 136 within an image capturing device (e.g., image capturing device 100).

Method 700 begins at the start block 702. At block 704, processor 102 receives a user selection of a previously recorded video file (i.e., encoded modified video frame data 260) for background replacement with a user selected background image. In another embodiment, processor 102 can receive a user selection of a previously recorded image (i.e., photo) for background replacement with a user selected background image. Processor 102 receives a user selection of one or more user selected background images 270 (block 706). In one embodiment, user selected background images 270 can be a single image. In another embodiment, user selected background images 270 are background video images or frames.

In an optional embodiment, processor 102 retrieves the user selected encoded modified video frame data 260 (block 708) and decodes the user selected encoded modified video frame data 260 (block 710). Processor 102 selects an initial video frame (i.e., video frame A data 222) (block 712) from the decoded video frame data or from user selected non-encoded video frame data received at block 704. Processor 102 identifies the background color 230 stored in meta-data 228 or in a pixel position 430 (FIG. 4B) of the video frame data (block 714). Processor 102 identifies specific pixels in the video frame data that have a color content that matches (i.e. is the same as) the background color 230 (block 716).

Processor 102 dynamically replaces the color content of the pixels that match the background color 230 with corresponding color content of the pixels from the user selected background image 270 (block 718). According to one aspect, the color content of pixels that do not match the background color 230 are foreground object pixels, and the color content of their respective pixels remain unchanged.

Processor 102 generates encoded post processed video frame data 240 for the respective video frame (i.e., video frame data A 222) based on the modified video frame data with the user selected background image (block 720). During encoding, the encoded post processed video frame data 264 is formatted and compressed (encoded) for faster processing and to take up less storage space.

Processor 102 stores the encoded post processed video frame data 264 to system memory 120 or to storage (block 722). At decision block 724, processor 102 determines if the current video frame data is the last video frame data in the sequence of video frames that is being post processed. In response to determining that the current video frame data is the last video frame data in the sequence of video frames that is being post processed, method 700 ends at end block 728. In response to determining that the current video frame data is not the last video frame data in the sequence of video frames that is being post processed, processor 102 selects the next video frame (i.e. video frame B data 240) (block 726) and returns to block 714 to continue identifying the background color 230 stored in meta-data 228 or in a pixel position 430 (FIG. 4B) for the next video frame. Processor 102 can repeat blocks 714-722 such that the color content of pixels that match the background color are dynamically replaced with the color content of pixels of a user selected background image for each video frame.

In the above-described methods of FIGS. 6 and 7, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
receiving frame data from at least one image sensor of a device;
generating, by the device, a first depth map based on the received frame data;
generating, by the device, first foreground image data and first background image data, based on the received frame data and the first depth map;
determining a least used color in the first foreground image data;
identifying the least used color as a first background color;
generating modified frame data by replacing the first background image data with the first background color and combining the first background color with the first foreground image data; and
storing the modified frame data to a memory of the device.

2. The method of claim 1, wherein determining the least used color in the foreground image data comprises:
generating, by the device, a color histogram of the first foreground image data; and selecting as the least used color a color that is one of not used or least used among colors represented within the color histogram.

3. The method of claim 1, wherein, in response to the frame data being first video frame data of a captured video having a plurality of video frames, the method further comprises:
receiving a second video frame data and a second depth map for a second video frame;
generating, by the device, second foreground image data and second background image data, based on the second video frame data and the second depth map;
generating a second color histogram of the second foreground image data;
determining a second least used color in the second color histogram;
identifying the second least used color as a second background color;
replacing the second background image data with the second background color; and
storing the second background color to the memory.

4. The method of claim 1, wherein, in response to the frame data being first video frame data of a captured video having a plurality of video frames, the method further comprises:
dynamically determining a corresponding background color for each of at least one subsequent video frame received after the first video frame data; and
replacing corresponding background image data with the determined corresponding background color in each of at least one subsequent video frame data.

5. The method of claim 1, further comprising:
receiving at least one user selected image;
retrieving the first background color from the memory; and
replacing pixel data of a plurality of pixels in the frame data that match the retrieved background color with corresponding pixel data of pixels from the user selected image.

6. The method of claim 1, further comprising:
storing the first background color in a meta-data of the frame data.

7. The method of claim 1, further comprising:
replacing pixel data of a first pixel of the frame data with the first background color.

8. A device comprising:
a memory;
an image sensor;
a display for outputting images; and
one or more processors communicatively coupled to the memory, the image sensor, and the display, the one or more processors executing program code, which execution enables the device to:
receive, from the image sensor, frame data;
generate a first depth map based on the received frame data;
generate first foreground image data and first background image data, based on the received frame data and the first depth map;
determine a least used color in the first foreground image data;
identify the least used color as a first background color;
generate modified frame data by replacing the first background image data with the first background color and combining the first background color with the first foreground image data; and
forward the modified frame data to the display for presentation thereon.

9. The device of claim 8, wherein the processor is further enabled to:
store the first background color to the memory; and
store the modified frame data to the memory.

10. The device of claim 8, wherein in response to the frame data being first video frame data of a captured video having a plurality of video frames, the processor is further enabled to:
receive a second video frame data and a second depth map for a second video frame;
generate second foreground image data and second background image data, based on the second video frame data and the second depth map;
generate a second color histogram of the second foreground image data;
determine a second least used color in the second color histogram;
identify the second least used color as a second background color;
replace the second background image data with the second background color; and
store the second background color to the memory.

11. The device of claim 8, wherein in response to the frame data being first video frame data of a captured video having a plurality of video frames, the processor is further enabled to:
dynamically determine a corresponding background color for each of at least one subsequent video frame received after the first video frame data; and
replace corresponding background image data with the determined corresponding background color in each of at least one subsequent video frame data.

12. The device of claim 8, wherein the processor is further enabled to:
receive at least one user selected image;
retrieve the first background color from the memory; and
replace pixel data of a plurality of pixels in the frame data that match the retrieved background color with corresponding pixel data of pixels from the user selected image.

13. The device of claim 8, wherein the processor is further enabled to:
store the first background color in a meta-data of the frame data.

14. The device of claim 8, wherein the processor is further enabled to:
replace pixel data of a first pixel of the frame data with the first background color.

15. A computer program product comprising:
a non-transitory computer readable storage device with program code stored thereon which, when executed by one or more processors of a device having an image sensor and a memory, enables the device to complete the functionality of:
receiving, from the image sensor, frame data;
generating a first depth map based on the received frame data;
generating first foreground image data and first background image data, based on the frame data and the first depth map;
determining a least used color in the first foreground image data;
identifying the least used color as a first background color;

generating modified frame data by replacing the first background image data with the first background color and combining the first background color with the first foreground image data; and storing the modified frame data to a memory of the device.

16. The computer program product of claim 15, wherein determining the least used foreground color in the first foreground image data comprises the program code further enabling the device to complete the functionality of:

generating, by the device, a color histogram of the first foreground image data; and selecting as the least used color a color that is one of not used or least used among colors represented within the color histogram.

17. The computer program product of claim 15, wherein in response to the frame data being first video frame data of a captured video having a plurality of video frames, the program code further comprises program code that enables the device to complete the functionality of:

receiving a second video frame data and a second depth map for a second video frame;

generating, by the device, second foreground image data and second background image data, based on the second video frame data and the second depth map;

generating a second color histogram of the second foreground image data;

determining a second least used color in the second color histogram;

identifying the second least used color as a second background color;

replacing the second background image data with the second background color; and storing the second background color to the memory.

18. The computer program product of claim 15, wherein in response to the frame data being first video frame data of a captured video having a plurality of video frames, the program code further comprises program code that enables the device to complete the functionality of:

dynamically determining a corresponding background color for each of at least one subsequent video frame received after the first video frame data; and replacing corresponding background image data with the determined corresponding background color in each of at least one subsequent video frame data.

19. The computer program product of claim 15, wherein the program code further comprises program code that enables the device to complete the functionality of:

receiving at least one user selected image;

retrieving the first background color from the memory; and replacing pixel data of a plurality of pixels in the frame data that match the retrieved background color with corresponding pixel data of pixels from the user selected image.

* * * * *